United States Patent Office 3,471,618
Patented Oct. 7, 1969

3,471,618
2-SUBSTITUTED CYCLIC THIOIMIDATES AS FUNGICIDES
John J. Beereboom, Old Lyme, Conn., assignor to Chas. Pfizer & Co. Inc., New York, N.Y., a corporation of Delaware
No Drawing. Filed Oct. 4, 1967, Ser. No. 672,716
Int. Cl. A01n 9/12
U.S. Cl. 424—246    10 Claims

ABSTRACT OF THE DISCLOSURE

The use of a series of 2-substituted 5,6-dihydro-4H-1,3-thiazines and 2-thiazolines as fungicides and fungistats is described.

Background of the invention

This invention relates to the use of a series of 5,6-dihydro-2-substituted-4H-1,3-thiazines and 2-substituted-2-thiazolines as fungicides and fungistats for the protection of organic materials and particularly for the post-harvest protection of plants, fruits and vegetables against attack by fungi.

Despite the concerted attack by modern man on methods for controlling the attack of fungi on organic matter, and especially on fruit and vegetables post-harvest, substantial economic losses continue to plague the world.

Summary of the invention

It has now been found that various 2-substituted cyclic thioimidates are effective agents for the control (prophylactic and eradication) of post-harvest fungal attack on fruits and vegetables. Many of these compounds are highly effective fumigants. The 2-substituted cyclic thioimidates of this invention have the formulae:

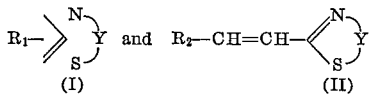

and the non-toxic acid addition salts thereof wherein Y is selected from the group consisting of ethylene and trimethylene;

$R_1$ is selected from the group consisting of alkyl, benzyl, 2-thenyl, phenyl, phenoxymethyl, piperidinomethyl, 3,3-dimethyl-1-butenyl;

$R_2$ is selected from the group consisting of 2-furyl, 2-thienyl, 3-thienyl, methyl substituted 2-thienyl, pyridyl, naphthyl, pentafluorophenyl, 3,4-methylenedioxyphenyl, phenyl, and mono-substituted phenyl wherein the substituent is selected from the group consisting of chloro, bromo, fluoro, lower alkyl, lower alkoxy, hydroxy and nitro.

By "non-toxic" acid addition salts is means those salts which are non-toxic at the levels used to achieve fungistatic or fungicidal action. The non-toxic acid addition salts of the above mentioned bases which may be employed are the water soluble and water insoluble salts such as the hydrochloride, hydrobromide, phosphate, nitrate, sulfate, acetate, hexafluorophosphate, citrate, gluconate, benzoate, propionate, butyrate, sulfosalicylate, maleate, laurate, malate, fumarate, succinate, oxalate, tartrate amsonate (4,4'-diaminostilbene-2,2'-disulfonate), pamoate (1,1' - methylene-bis-2-hydroxy-3-naphthoate), stearate, 2-hydroxy-3-naphthoate, p-toluenesulfonate, suramin salt, methiodide, methobromide, methochloride and resin adsorbates. The hexafluorophosphate salts are especially valuable as a means for isolating the novel products of this invention from aqueous mixtures of the free bases or of water soluble acid addition salts. They precipitate out rapidly and quantitatively or almost quantitatively as crystalline products and are easily purified as by washing with water. They thus serve as a means for recovering and purifying these novel cyclic thiomidates. The free bases are, in turn, easily recovered from the hexafluorophosphate salts by neutralization. The solubility of the herein described bases in a given solvent system can, of course, be increased or decreased by judicious choice of the appropriate salt.

The compounds described herein are applied in the form of solutions, as dusts, slurries or sprays. Some of these compounds have sufficient vapor pressure to permit their use as vapors, that is, as fumigants. This is true of the base forms of compounds of Formula I and especially those compounds wherein $R_1$ is alkyl having up to ten carbon atoms.

These compounds permit the control of a variety of fungal diseases. By "control" is means the prevention and retardation of fungal growth and the eradication of such growth. Those compounds having fumigant properties (Formula I, $R_1$=alkyl of up to 10 carbon atoms) are especially useful for such purposes.

Detailed description of the invention

The compounds of this invention are prepared by known methods. Those compounds of this invention having Formula II are readily and conveniently prepared by the direct condensation of the desired carboxaldehyde ($R_2$CHO) with 5,6-dihydro-2-methyl-4H-1,3-thiazine or 2-methyl-2-thiazoline as is described in Belgian Patent 684,437 and by Kuhn and Drawert in Ann. 590, 55–75 (1954). The reaction is conducted in general at an elevated temperature, that is, at a temperature sufficiently high to remove the byproduct water formed. Temperatures of from about 80° C. to about the decomposition point of the reactants and product can be used. It is advantageous to use a reaction-inert solvent, desirably one which forms an azeotrope with water, and temperatures of from about 80° C. to the reflux temperature of the solvent. The compounds thus produced have the trans configuration. The cis isomers are obtained by irradiation of the trans isomers.

A convenient and preferred procedure for making compounds having Formula I comprises the condensation of the appropriate ($R_1$ substituted) cyanide, e.g. hexyl cyanide, with 3-amino-1-propanethiol or 2-ominaethanethiol ($H_2N$—Y—SH wherein Y is as defined above).

In another method the imido ester hydrochlorides, prepared from the desired ($R_1$-substituted) cyanides by known methods, are treated with $H_2N$—Y—SH to produce the corresponding cyclic thioimidate hydrochloride. Alternatively, the imido ester, free base form, is reacted with an alcoholic solution of $H_2$—N—Y—SH hydrochloride or other acid addition salt. Suitable alcohols are methanol, ethanol, butanol, propanol and 2-propanol. Other solvents such as dioxane, tetrahydrofuran, ethylene glycols can also be used. An excess of the amine can be used as solvent, if desired. For large scale reactions, that is, reactions larger than laboratory scale, the use of a solvent of the type mentioned above is preferred. The reaction is carried out at a temperature of from about —5° C. to 50° C. and preferably at from about —5° C. to about 30° C. until formation of the product is complete or essentially complete. The cyclic thioimidate hydrochloride is recovered, e.g. removal of the solvent and recrystallization of the residue from a suitable solvent system.

Still another method for preparing these compounds involves the cyclization of the appropriate N-(ω-hydroxy alkyl)[$R_1$-substituted)alkanoic acid amide];

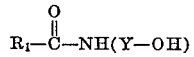

e.g. N-(3-hydroxypropyl)phenylacetamide; N-(3-hydroxypropylbenzamide; N-(2-hydroxyethyl)acetamide in the presence of phosphorous pentasulfide. The starting N-(ω-hydroxyalkyl) [(R₁-substituted)alkanoic acid amides] are prepared according to known methods of amide formation, e.g. from the appropriate (R₁-substituted)alkanoic acid ester and H₂N—Y—OH under conditions whereby the by-product alcohol is removed.

The hydrochloride salts prepared as described herein can be readily converted to the free base simply by neutralization of the acid portion of the salt by aqueous sodium or potassium hydroxide and the water insoluble free base recovered by mechanical means or by solvent extraction with a suitable immiscible solvent such as ethyl acetate. The free base, isolated by removal of the solvent, can, if desired, be purified by recrystallization from a suitable solvent system or by vacuum distillation. Alternatively, the free bases are obtained by neutralization of an acid salt with sodium methoxide in methanol and recovery of the base by known methods. Other acid addition salts can be readily prepared simply by dissolving the free base in a suitable solvent, e.g. acetone, water, a lower aliphatic alcohol (ethanol, isopropanol) containing the desired acid, or to which the desired acid is subsequently added. The salts are recovered by filtration, precipitation with a non-solvent, by evaporation of the solvent or, in the case of aqueous solutions, by lyophilization. In this manner, the sulphate, nitrate, phosphate, acetate, propionate, butyrate, citrate, gluconate, benzoate, pamoate, amsonate, 2-hydroxy-3-naphthoate, hexafluorophosphate, sulphosalicylate and other salts can be prepared. Such preparations are described in Belgian Patent 684,437.

The cyclic thioimidates described above and their salts are active against a wide variety of fungi such as:

*Phytophthora citrophthora, Sclerotina fructicola, Botrytis cinera, Geotrichum candidum, Alternaria citri, Diplodia natelensis, Penicillium digitatum, Aspergillus niger, Fusarium oxysporum, Phomopsis citri, Thielaviopsis paradoxa, Glomerella cingulata, Rhizopus stolonifera, Gloesporium musarium.*

They exhibit substantial activity against such fungi at levels ranging from about 1000 to about 5000 p.p.m. when applied in solution or suspension form, or as dusts for post-harvest treatment.

The amount of the herein described compounds of Formula I, base form, required for use as fumigants, is, of course, dependent upon the activity and vapor pressure of the particular compound. Of particular value as fumigants are those compounds of Formula I wherein R₁ is alkyl of from 4 to 8 carbon atoms, and 3,3-dimethyl-1-butenyl. In such instances the fungicide is impregnated into the liner or wrapper of a box containing the fruit or vegetables. Levels of from about 0.5 to about 3 g. of compound per box have been found most effective for this purpose.

The approximate sizes of boxes used to ship various fruits are: cherries and grapes, 16 x 14 x 8 inches; citrus, peaches, pears, 16 x 18 x 30 inches; apples as for citrus, also bushel baskets.

The following examples are provided to illustrate the present invention. They are, however, not to be construed as limiting the scope thereof in any way.

Example I.—In vitro screening procedure for post-harvest decay control

A stock solution of the test compound is prepared by dissolving 10 mg. of sample in 1 ml. of an appropriate solvent such as a low molecular weight alcohol containing up to four carbon atoms (ethanol, isopropanol, n-butanol), adding 9 ml. of sterile distilled water and mixing thoroughly. One ml. of stock solution is then placed aseptically in each of 5 petri dishes to which are added 9 ml. of sterile potato dextrose agar. Each petri dish is gently swirled to mix the stock solution and agar, then allowed to harden. The plates thus prepared bear a concentration of test compound equivalent to 100 mcg./ml.

Inoculum of the fungus against which the compound is to be tested are obtained from potato dextrose agar slants incubated with the appropriate fungus for from 10–14 days at 28° C. The slants are washed with 2 ml. of sterile distilled water, then scraped lightly with a sterile Nichrome loop. One loopfull of inoculum is streaked on the agar near the edge of the petri dish. Four different organisms are streaked on each plate. The plates are then stacked, 5 plates per stack, inverted and incubated at 28° C. for 4 days. Control plates are run in the same fashion except that none of the test compound is mixed with the agar. The plates are then observed for growth of the fungi.

The control plates are considered as 100% growth of the fungus. The activity of the test compounds are then determined by comparing the growth of the fungus on the agar containing the compound with that on the control.

The antifungal activity of several compounds of Formulae I and II determined by this procedure is presented below in Tables I–II. All compounds were tested at 100 mcg./ml. Each + represents 25% of control. The value ++, for example, indicates fungal growth was 50% of that in the control test.

TABLE I

Antifugal Activity of 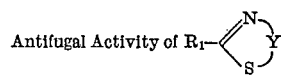

| R₁ | Y | Botrytis cinera | Penicillium digitatum | Aspergillus niger | Fusarium oxysporum | Rhizopus stolonifera |
|---|---|---|---|---|---|---|
| CH₃ [a] | tri | Tr [b] | ++ | ++ | ++ | ++ |
| C₂H₅ | tri | Tr | + | + | + | ++ |
| n-C₃H₇ | tri | Tr | + | + | + | ++ |
| n-C₄H₉ | tri | Tr | + | + | + | + |
| n-C₄H₉ | eth | — [d] | + | + | ++ | ++ |
| C₅H₁₁ | tri | + | + | Tr | ++ | ++ |
| C₆H₁₃ | tri | Tr | + | + | + | + |
| C₇H₁₅ | eth | ++ | + | + | + | ++ |
| C₇H₁₅ | tri | Tr | Tr | + | + | ++ |
| C₈H₁₇ | tri | — | Tr | + | + | ++ |
| C₁₀H₂₁ | tri | ++ | + | + | ++ | ++ |
| C₁₁H₂₃ | tri | Tr | Tr | Tr | Tr | ++ |
| C₁₂H₂₅ | tri | Tr | + | ++ | +++ | ++ |
| C₁₃H₂₇ | tri | Tr | ++++ | +++ | ++ | +++ |
| C₁₇H₃₅ | tri | + | +++ | +++ | + | +++ |
| benzyl | tri | — | — | Tr | Tr | — |
| benzyl | eth | Tr | + | + | ++ | ++ |
| 2-thenyl | eth | — | + | ++ | + | Tr |
| 2-thenyl [a] | tri | Tr | Tr | + | + | + |
| phenyl [c] | tri | Tr | + | + | ++ | ++ |
| phenoxymethyl [a] | eth | ≈ | Tr | + | + | + |
| N-piperidinomethyl | eth | ++ | + | ++ | + | ++ |

[a] Tested as hydrochloride salts.
[b] Trace amount of growth.
[c] Tested as HPF₆ salt.
[d] Complete inhibition.

TABLE II

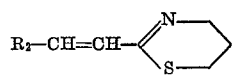

|  | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| Phytophthora citrophthora |  | − | − |  |  |  |  |  | + | Tr | − | − | − |  |
| Sclerotinia fructicola |  |  |  |  |  |  |  |  | − | Tr |  |  |  |  |
| Botrytis cinera | − | − | − | − | − | − | − | − | − | − | − | − | − | − |
| Geotrichum candidum |  | +++ | +++ |  |  |  |  |  | ++ | +++ | Tr | − | + |  |
| Alternaria citri |  | Tr | − |  |  |  |  |  | Tr | ++ | − | − | − |  |
| Diplodia natelensis |  | +++ | +++ |  |  |  |  |  | ++ | +++ | − | − | − |  |
| Penicillium digitatum | − | − | Tr | Tr | + | − | Tr | − | − | + | − | − | − | − |
| Aspergillus niger | + | ++ | + | + | + | Tr | + | Tr | ++ | +++ | Tr | − | − | − |
| Fusarium oxysporum | Tr | − | Tr | Tr | + | Tr | Tr | Tr | Tr | + | − | − | − | − |
| Phomopsis citri |  | − | Tr |  |  |  |  |  | Tr | ++ | − | − | − |  |
| Thielaviopsis paradoxa |  | − | Tr |  |  |  |  |  | + | ++ | − | − | − |  |
| Glomerella cingulata |  | + | ++ |  |  |  |  |  | − | + | − | − | − |  |
| Rhizopus stolonifera | Tr | Tr | Tr | +++ | + | + | ++ | Tr | ++ | ++ | − | − | − | − |

|  | 15 | 16 | 17 | 18 | 19 | 20 | 21 | 22 | 23 | 24 | 25 | 26 | 27 | 28 |
|---|---|---|---|---|---|---|---|---|---|---|---|---|---|---|
| Phytophthora citrophthora |  |  |  |  |  | − |  |  |  | − |  |  |  | − |
| Sclerotinia fructicola |  |  |  |  |  | − |  |  |  | − |  |  |  | − |
| Botrytis cinera | − | − | Tr | − | − | − | − | − | − | − | Tr | Tr | Tr | − |
| Geotrichum candidum |  |  |  |  |  | + |  |  |  | +++ |  |  |  | + |
| Alternaria citri |  |  |  |  |  | − |  |  |  | ++ |  |  |  | − |
| Diplodia natelensis |  |  |  |  |  | − |  |  |  | ++ |  |  |  | + |
| Penicillium digitatum | − | − | + | − | − | − | − | − | − | Tr | Tr | + | Tr | − |
| Aspergillus niger | − | Tr | +++ | − | − | − | + | Tr | − | ++ | ++ | + | + | − |
| Fusarium oxysporum | − | − | + | − | − | − | Tr | Tr | Tr | + | + | + | + | − |
| Phomopsis citri |  |  |  |  |  | − |  |  |  | − |  |  |  | − |
| Thielaviopsis paradoxa |  |  |  |  |  | − |  |  |  | − |  |  |  | − |
| Glomerella cingulata |  |  |  |  |  | − |  |  |  | Tr |  |  |  | − |
| Rhizopus stolonifera | − | − | ++ | − | Tr | − | ++ | + | − | ++ | + | + | +++ | − |

COMPOUND LIST

| Cpd. No. | $R_2$ | Salt | Cpd. No. | $R_2$ | Salt | Cpd. No. | $R_2$ | Salt |
|---|---|---|---|---|---|---|---|---|
| 1 | phenyl | $HPF_6$ | 11 | 2-chlorophenyl | HCl | 21 | 3,4-methylenedioxyphenyl | HCl |
| 2 | 2-tolyl | HCl | 12 | 3-chlorophenyl | HCl | 22 | 1-naphthyl | HCl |
| 3 | 3-tolyl | HCl | 13 | 4-chlorophenyl | $HPF_6$ | 23 | 2-naphthyl |  |
| 4 | 2-ethylphenyl | HCl | 14 | 2-bromophenyl | HCl | 24 | 2-thienyl |  |
| 5 | 2-methoxyphenyl | $HPF_6$ | 15 | 3-bromophenyl | HCl | 25 | 3-thienyl | $HPF_6$ |
| 6 | 3-methoxyphenyl | $HPF_6$ | 16 | 4-bromophenyl | HCl | 26 | 5-methyl-2-thienyl | $HPF_6$ |
| 7 | 4-methoxyphenyl | HCl | 17 | 2-fluorophenyl | $HPF_6$ | 27 | 2-furyl | $HPF_6$ |
| 8 | 2-nitrophenyl | $HPF_6$ | 18 | 3-fluorophenyl | HCl | 28 | 4-pyridyl |  |
| 9 | 3-nitrophenyl |  | 19 | 4-fluorophenyl | HCl |  |  |  |
| 10 | 4-nitrophenyl |  | 20 | pentafluorophenyl | HCl |  |  |  |

Example II.—Procedure for vapor phase testing

Approximately 20 ml. of potato dextrose agar is allowed to harden in the bottom section of a petri dish. The desired fungus, such as Botrytis cinera, is then stabbed into the agar. At the point in the petri dish cover corresponding to the location of the stab, 10 mg. of sample compound is placed and the inoculated agar inverted over the compound. The plate is then incubated at 28° C. for from 4 to 7 days depending upon the length of time required for the control plate (agar minus compound) to grow. The plates are then observed for degree of sporulation (light, moderate, heavy or none) and degree of inhibition. This latter property is determined by measuring the diameter of the zone of growth in mm.

TABLE IV

Vapor Phase Activity 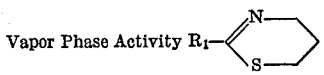

|  |  | Growth, mm. | Sporulation | Control Growth, mm. | Control Sporulation |
|---|---|---|---|---|---|
| $R_1$ | Fungus |  |  |  |  |
| $C_2H_5$ | P. digitatum | 18 | Heavy | 38 | Heavy. |
| n-$C_3H_7$ | P. digitatum | 24 | ...do | 38 | Do. |
| n-$C_4H_9$ | P. digitatum | 14 | Light | 39 | Do. |
| n-$C_4H_9$ | B. cinera | 24 | ...do | 55 | Do. |
| $C_5H_{11}$ | P. digitatum | (*) |  | 52 | Do. |
| $C_6H_{13}$ | P. digitatum |  |  | 38 | Do. |
| $C_7H_{15}$ | P. digitatum |  |  | 35 | Do. |
| $C_7H_{15}$ | B. cinera |  |  | 55 | Do. |
| $C_8H_{17}$ | B. cinera | 34 | Heavy | 55 | Do. |
| $C_9H_{19}$ | B. cinera | 37 | ...do | 55 | Do. |
| $(CH_3)_3$—C—CH=CH— | P. digitatum |  |  | 42 | Do. |

*Complete inhibition.

Example III

Freshly picked grapefruit is dipped into a solution of 5,6-dihydro-2-(2-chlorostyryl)-4H - 1,3 - thiazine hydrochloride (0.1%, 1000 p.p.m.) for a period of one minute. The grapefruit is then stored on racks at room temperature and periodically checked for spoilage. An equal number of untreated grapefruit serve as control.

A similar test is run using the test compound at 0.5% (5000 p.p.m.) concentration.

In each case the dipped grapefruit exhibits a much lower spoilage rate. The principal fungus involved is Penicillium digitatum.

Example IV

Repetition of the preceding experiment but using the remaining compounds of Tables I and II produces similar results.

Example V

The procedure of Example IV is repeated but using oranges and cantaloupes in place of grapefruit. In this example, Penicillium digitatum was the principal fungus causing decay of the fruit.

The treated fruit exhibited a much better shelf-life than did the untreated (control) fruit.

Example VI

The paper liners of twenty boxes (16 x 18 x 30 in.) are each impregnated with 3.0 g. of 2-hexyl-2-thiazoline by brushing a 5% ethanolic solution of the compound on the liner and allowing it to dry. Five of the boxes are then filled with grapefruit, five with oranges, five with apples and five with bananas. An equal number of boxes of each fruit serve as controls.

The boxes are stored in a large shed at ambient temperature (18°–20° C.) and checked periodically. In each instance the fruit in the boxes bearing the treated liners displayed improved storage life over the controls.

Similar results are obtained when 2-hexyl-2-thiazoline is replaced by 2-heptyl-, 2-pentyl and 3,3-dimethyl-1-butenyl-2-thiazoline.

Example VII

A set of five boxes (16 x 14 x 8 in.) is lined with paper impregnated with 0.5 g. of 2-heptyl-2-thiazoline. Two additional sets of five boxes each are lined with paper impregnated with 1.5 g. and 2.5 g. of fungicide, respectively. The boxes are filled with cherries and stored at 20°–22° C. An equal number of boxes are used as control.

The boxes lined with fungicidally treated paper showed, at all levels of treatment, improved shelf life over the controls.

Example VIII

Two dozen freshly picked cantaloupes are dipped into a solution of 5,6-dihydro-2-(3-methylstyryl) - 4H - 1,3-thiazine hydrochloride (0.1%, 1000 p.p.m.) for a period of one minute then stored on racks at room temperature. An equal number of freshly picked cantaloupes serve as control.

Daily observation of the cantaloupes showed a much lower rate of spoilage for the treated fruit. The principal fungus involved is *Alternaria citri*.

Similar results are obtained with the sulfate, acetate, hexafluorophosphate, citrate, pamoate, maleate and 2-hydroxy-3-naphthoate salts of this antifungal agent.

Example IX

Repetition of Experiment VIII but using the following compounds in place of 2-(3-methylstyryl)-4H-1,3-thiazine hydrochloride produces similar results.

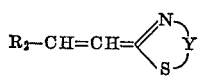

| R₂ | Y* | Salt |
|---|---|---|
| 3-nitrophenyl | tri | |
| 2-chlorophenyl | tri | HCl |
| 3-chlorophenyl | tri | HCl |
| 4-chlorophenyl | tri | HPF₆ |
| pentafluorophenyl | tri | HCl |
| 2-thienyl | tri | |
| 4-pyridyl | tri | |
| 2-chlorophenyl | eth | HCl |
| 4-chlorophenyl | eth | pamoate |
| 4-pyridyl | eth | 2-hydroxy-3-naphthoate |
| 2-bromophenyl | tri | sulfate |
| 3-tolyl | tri | acetate |
| 2-chlorophenyl | tri | citrate |
| 2-chlorophenyl | eth | sulphosalicylate |

*tri=trimethylene; eth=ethylene.

Example X

Peaches are protected against *Rhizopus stolonifera* by a spray application of a solution containing 2000 p.p.m. of 5,6-dihydro-2-(2-chlorostyryl)-4H-1,3-thiazine hydrochloride. The spray is applied to the fruit through an atomizer while the fruit revolves slowly on a roller table. The fruit is in contact with the atomized spray for a period of one minute. It is then stored on racks at room temperature and checked daily for Rhizopus rot.

Peaches thus treated are far more resistant to spoilage than are untreated peaches.

Similar results are obtained with the compounds listed in Example IX.

Example XI

Peaches are dusted with 5,6-dihydro-2-(4-bromostyryl)-4H-1,3-thiazine hydrochloride as follows.

Peaches are placed on a roller table covered with a hood. The above compound is dusted inside the hood through an atomizer at a level of 5000 p.p.m. The fruit is slowly revolved and retained within the hood for one minute during which time a fine dust of compound settles on the peaches. The thus treated fruit exhibits improved shelf-life over untreated fruit against Rhizopus rot.

What is claimed is:

1. A method for the control of fungal disease attack on fruit which comprises contacting the fungi with a fungicidally effective amount of a compound selected from the group consisting of those having the formulae:

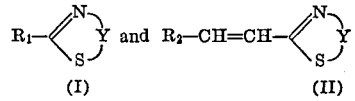

and the non-toxic acid addition salts thereof wherein Y is selected from the group consisting of ethylene and trimethylene;

$R_1$ is selected from the group consisting of alkyl, benzyl, 2-thenyl, phenyl, phenoxymethyl, piperidinomethyl, and 3,3-dimethyl-1-butenyl;

$R_2$ is selected from the group consisting of 2-furyl, 2-thienyl, 3-thienyl, methyl substituted 2-thienyl, pyridyl, naphthyl, pentafluorophenyl, 3,4-methylenedioxyphenyl, phenyl, and mono-substituted phenyl wherein the substitutent is selected from the group consisting of chloro, bromo, fluoro, lower alkyl, lower alkoxy, hydroxy and nitro.

2. The method according to claim 1 wherein the free base of said selected compound is of Formula II wherein $R_2$ is pentafluorophenyl and Y is trimethylene.

3. The method according to claim 1 wherein the free base of said selected compound is of Formula II wherein $R_2$ is 4-pyridyl and Y is trimethylene.

4. The method according to claim 1 wherein the free base of said selected compound is of Formula II wherein $R_2$ is naphthyl and Y is trimethylene.

5. The method according to claim 1 wherein the free base of said selected compound is of Formula I wherein $R_1$ is alkyl and Y is trimethylene.

6. The method according to claim 1 wherein the free base of said selected compound is of Formula II wherein $R_2$ is mono-substituted phenyl and Y is trimethylene.

7. The method according to claim 5 wherein the vapor phase of the compound is employed.

8. The method according to claim 6 wherein $R_2$ is chloro substituted phenyl.

9. The method according to claim 6 wherein $R_2$ is bromo substituted phenyl.

10. The method according to claim 6 wherein $R_2$ is fluoro substituted phenyl.

References Cited

FOREIGN PATENTS 684,437  7/1966  Belgium.

OTHER REFERENCES

Kuhn and Drawert: Liebigs Ann. Chem., 590, pp. 55–75 (1954).

ALBERT T. MEYERS, Primary Examiner

VINCENT D. TURNER, Assistant Examiner

U.S. Cl. X.R.

424—270

PO-1050
(5/69)

UNITED STATES PATENT OFFICE
CERTIFICATE OF CORRECTION

Patent No. 3,471,618　　　　　Dated October 7, 1969

Inventor(s) John J. Beereboom

It is certified that error appears in the above-identified patent and that said Letters Patent are hereby corrected as shown below:

Column 1, lines 37-39, formula I reading

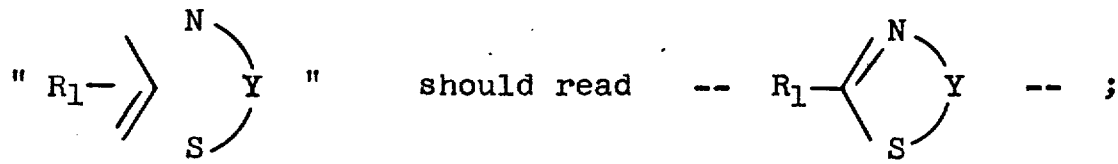

line 63, "tartrate amsonate" should read -- tartrate, amsonate --.
Column 2, line 32, "byproduct" should read -- by-product --;
　　line 43, "ominaethanethiol" should read -- aminoethanethiol --.
Columns 3 and 4, Table I, next to the last line under "Botrytis cinera", "$\approx$" should read --　-　--.
Columns 5 and 6, Table II, line 2, "fructcola" should read -- fructicola --.

SIGNED AND
SEALED
MAY 19 1970

(SEAL)
Attest:

Edward M. Fletcher, Jr.
Attesting Officer

WILLIAM E. SCHUYLER, JR.
Commissioner of Patents